April 16, 1968 P. L. A. DAVIS 3,378,267

PHONOGRAPH TONE ARM

Filed Feb. 7, 1966 3 Sheets-Sheet 1

United States Patent Office 3,378,267
Patented Apr. 16, 1968

3,378,267
PHONOGRAPH TONE ARM
Paul Leonard Anthony Davis, 7 The Grove, Osterley, England
Filed Feb. 7, 1966, Ser. No. 525,613
9 Claims. (Cl. 274—23)

ABSTRACT OF THE DISCLOSURE

A phonograph pick-up arm assembly having transducer connection means at one end and a counterbalance means at its other end is provided with a gimbal bearing assembly for mounting the arm. The unique gimbal bearing assembly is provided with electrically conductive pivotal elements therein which serve the dual function of both the mechanical pivoting means for the arm mount and as electrical conductor elements utilized to transmit the transducer signals from the arm. This invention eliminates the prior art problem of pick-up arm drag associated with the previously utilized arm connecting wires.

This invention relates to phonograph pick-up arm assemblies.

Pick-up arm assemblies of the high compliance type usually include a tubular arm, pivoted intermediate of its ends, carrying at one end a pick-up head having a transducer and stylus, and at its other end a counterweight unit for balancing the pick-up arm assembly. The pick-up head is electrically connected to an amplifier and like circuitry by means of wires which pass along the interior of the pick-up arm. The pivotal mounting of the arm is such that the arm is able to move about vertical and horizontal axes, and also such that bearing friction is kept as low as possible so as to avoid undue damping drag or the like upon the movements of the pick-up arm.

One consequence of the reduction of the bearing friction is that the drag imposed by the connecting wires, during the movements of the pick-up arm, become a factor which affects adversely the operational efficiency of the pick-up arm.

It is an object of the present invention to eliminate, or at least susbtantially reduce, the drag caused by interconnections between the pick-up head and the amplifier.

Accordingly, there is provided a phonograph pick-up arm assembly comprising an arm carrying pick-up connection means at one end, counterbalance means at its other end, and a pivotal bearing assembly for the arm intermediate its ends, said bearing assembly including electrically conductive bearing elements establishing electrical connection therebetween.

In order to make the invention clearly understood, reference will now be made to the accompanying drawings which are given by way of example and in which.

Figure 1:
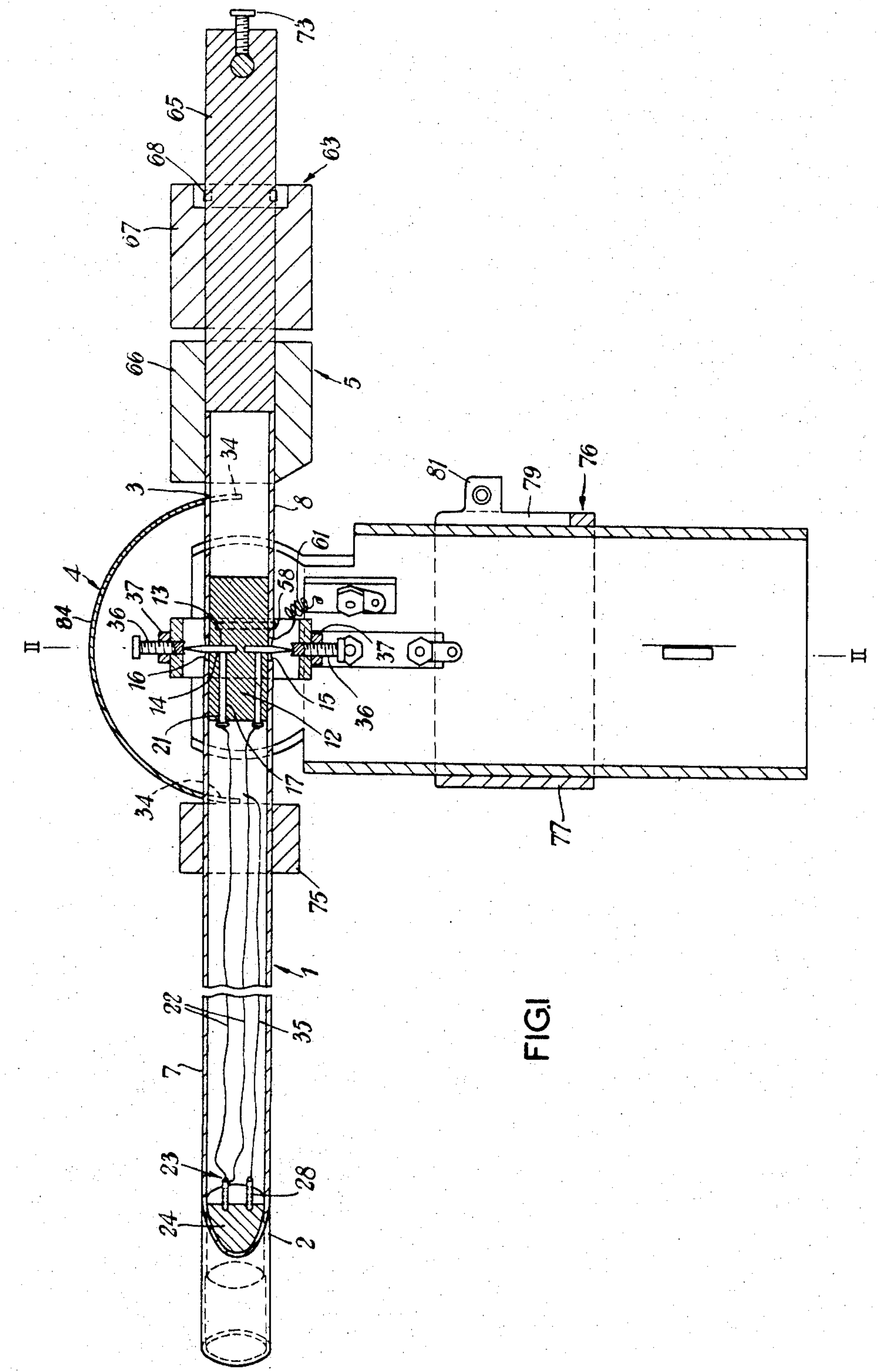
FIGURE 1 is a sectional side elevation view of a pick-up arm assembly.
Figure 2:
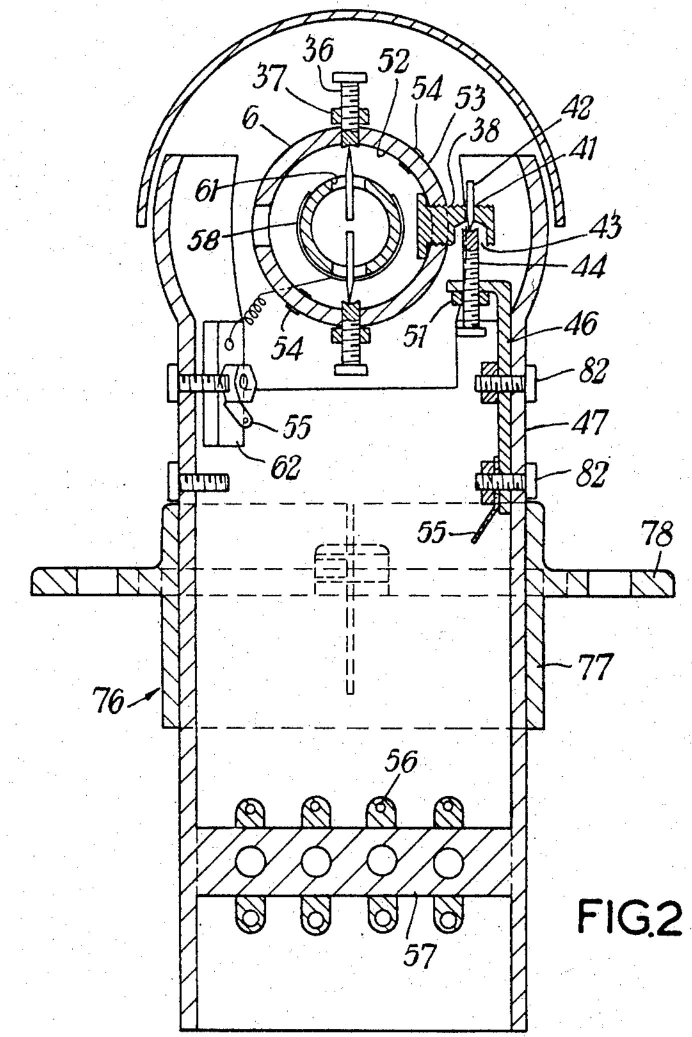
FIGURE 2 is a sectional view along the line II—II of FIGURE 1.
Figure 4:
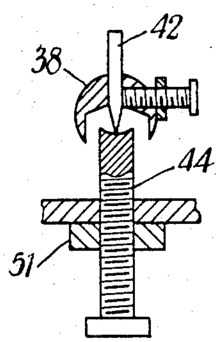
FIGURE 4 is a fragmentary sectional view along the line IV—IV of FIGURE 3.
Figure 5:
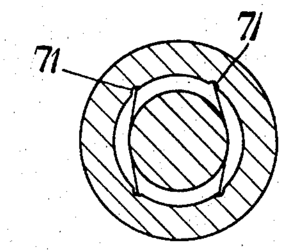
FIGURE 5 is a sectional view along the line V—V of FIGURE 3.
Figure 3:
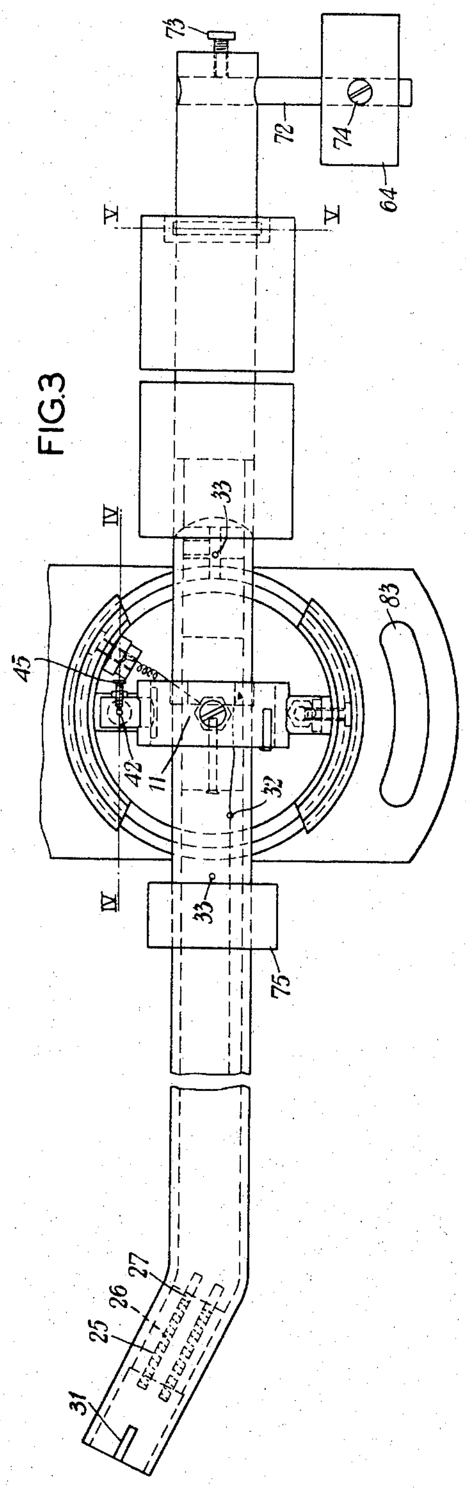
FIGURE 3 is a plan view of the pick-up arm assembly of FIGURE 1.

The pick-up arm assembly includes a tubular arm 1 pivotally supported intermediate its ends 2 and 3 in a mounting generally indicated by reference numeral 4 which allows pivotal movement about two axes which are mutually perpendicular, the end 2 of the arm 1 being adapted for carrying a known transducer and stylus head (not shown) and the other end 3 carrying a counterweight arrangement 5 for balancing the pick-up arm assembly, both longitudinally and laterally.

The pick-up head can be of any desired form, provided that it is first mounted in a known standard shell which the pick-up arm is designed to accept.

The bearing assembly essentially includes a gimbal 6 within which the pick-up arm is pivotally mounted for pivotal movement about the vertical axis, the gimbal 6 itself being pivotally mounted for movement about the horizontal axis.

In particular the pick-up arm comprises an aluminum tube 1 bent through an angle of 27° in a horizontal plane, at a point near to the end 2 which will carry the transducer shell, but sufficiently distant from it to allow the shell to be plugged into a straight portion of the member. The tube 1 is divided into two parts, the front part 7 which carries the transducer shell and the rear part 8 carrying the counterweights 5, by a cut 11 which is positioned at the intended common pivotal axis of the pick-up arm. The two tube parts 7 and 8 are connected together by means of an electrically insulating plug 12 in the form of an extruded synthetic plastic rod, the plug 12 being a tight fit within the ends of the tube parts. A suitable synthetic plastic for this purpose is the protein plastic casein.

The plug 12 is drilled radially with holes 13 extending almost to the longitudinal axis thereof from the opposite ends of a diameter. The radial holse 13 each receive the butt end of an electrically conductive spindle bearing pin 14 which is made of a very hard metal and highly polished for minimum friction, and sharply pointed at its bearing end. These pins 14 are intended to define the vertical pivotal axis of the pick-up arm. Clearance bores 15 for the pins 14 are formed in the tube 1 so that electrical connection between the pins 14 and the tube 1 cannot take place. In practice each clearance bore 15 is constituted by a C-shaped recess 16 at the cut end of each tube part 7 and 8, which mate together to form the bores 15 when the parts 7 and 8 are brought together.

Two further holes 17 are drilled in the plug 12, these holes 17 being axially directed and disposed parallel to each other. The inner end of each axial hole 17 intersects one of the radial holes 13. Each axial hole 17 carries a screw 21 which makes good electrical contact with the respective bearing pin 14 introduced into the radial hole 13, at a point approximately midway along the length of the embedded portion of the pin, and which also acts as a means for locking the bearing pin in the plug.

The heads of the screws 21 are each connected to fine insulated wires 22 which are connected to terminals 23 of a connecting plug 24 situated in the outer end of the front part 7 of the arm, which will make electrical contact with terminal pins of the transducer.

This connecting plug 24 is conveniently formed by a length of the same type of synthetic plastic rod which was used to form the plug 12 joining the two tube parts 7 and 8, and is made in the following manner:

A length of synthetic plastic rod is drilled longitudinally four times, the four holes 25 being equidistant from the rod axis and on two perpendicular diameters and spaced apart by approximately the distance between the terminal pins on the transducer shell. Four small compression springs 26 each with one end occluded with solder and the other terminating a length of straight wire 27 are inserted one into each hole 25 the same way about, each being free to move in its hole while not being unduly loose.

The uncompressed length of each spring 26 is the same as that of the plug 24 and each one is positioned with its soldered end flush with the outer end face of the plug 24, so that its length of straight wire 27 protrudes from the opposite end of the plug 24. Four short pieces of copper wire 28 of the same diameter as the springs 26 are inserted one into each hole 25 from the ends where the spring wire 27 protrudes, and are pushed firmly in for a short distance, for example 1/16", the copper wire 28 in turn pushing the spring 26 before it so that now the soldered ends protrude beyond the outer end face of the plug 24 by 1/16". The combined thickness of the copper wire 28 and spring wire 27 make a tight fit in each hole 25 so that the springs 26 are now retained in this position. The pieces of copper wire 28 are of such a length that a stub of wire is left at the end of each hole 25 for the purposes of electrical connection to the wires 22 leading from the pin retaining screws 21 in the plug 12.

It will be appreciated that the soldered ends of the springs 26 are free to move axially in and out of their holes 25, on compression and release respectively, forming plungers with which the terminal pins of the transducer shell will make contact. The strength of the springs 26 must be sufficient to make adequate electrical contact but must not be so strong as to push the transducer shell out of the tubular arm. The material of the springs 26 must also be capable of bonding with solder. An alloy with the required characteristics has been found to be beryllium copper (Telcon bronze), provided that a low melting point solder is used, which additionally reduces the risk of damage by heat to the plug 24.

The terminal pins on the transducer shell with which the pick-up arm assembly is intended to be used, are mounted in a synthetic plastic terminal block contained in an outer cylindrical metal case, from which they slightly protrude. On the metal case, positioned radially at about half its length, is a small pin or spigot for the purpose of locating the shell exactly in the horizontal plane as the shell is inserted into the tube part 7. In the embodiment illustrated, the metal case of the transducer is slightly larger in diameter than the internal diameter of the tube 1 and so the end of the part 7 of the arm is drilled out or reamed to accommodate it. The length of the reamed portion of the part 7 is not made equal to the length of the metal transducer case but to the total length of the terminal pins thereof including the protruding parts. A longitudinal slot 31 is cut in the end of the part 7 so as to pass through the top of a vertical diameter across the free end of the tube part 7, the length of the slot 31 being just sufficient to accommodate the spigot on the transducer.

A small hole 32 is drilled in the right side, viewed from the front, of the arm part 7, near to the intended common pivotal axis but sufficiently distant from it to avoid its being obscured by the insertion of the bearing plug 12. Two further small holes 33 are drilled in the tops of the two tube parts 7 and 8 to receive two locating pegs 34 on a hollow hemispherical member 84 serving as a dust cover and electrical screen. The bearing pins 14, screws 21, wires 22, and the two plugs 12 and 24, are assembled into the pick-up arm as follows:

The bearing pins 14 are inserted into the radial holes 13 in the bearing plug 12 and the screws 21 are then screwed into place to lock the pins 14 in position, care being taken to ensure that good electrical contact has been made. The wires 22 are then soldered to the heads of the screws 21, care being taken to avoid damaging the synthetic plastic plug 12. Taking the front tube part 7, a third, earth or common return wire 35 is threaded through the small side hole 32 and passed along the tube 1 in the direction of the transducer shell. The two wires 22 attached to the pin retaining screws 21 are then passed into the end of the tube part 7 and along the tube in a similar direction, and the bearing plug 12 is pushed firmly into the said end until the pins 14 are accurately centred within the plane containing the end of the tube part 7, that is, so that the pins are concentric with the clearance bores 15. The other pick-up arm part 8 is then pushed on to the bearing plug 12, a suitable lubricant, for example petroleum jelly, being used to reduce friction and to avoid displacement of the plug 12 relative to the part 7 of the pick-up arm.

After a period of time the petroleum jelly softens the surface of the synthetic plastic and thereafter hardening occurs, thus making a firm bond between the bearing plug 12 and the rear part 8 of the arm. The latter may therefore be securely clamped in order to remove the front part 7 of the arm should this ever become necessary for any repair or maintenance after the arm has had considerable use. This bonding procedure applies to the use of casein, but for other plastics other known bonding procedures or adhesives may be used.

The plug 24 is symmetrical about its longitudinal axis and must therefore be marked at the intended top which should be at the end of a diameter midway between two pairs of adjacent springs 26, so that when viewed right way up there are springs in only two horizontal planes. The upper pair are each soldered via the copper terminal wires 28 to one of the two wires 22 leading from the pin retaining screws. Viewed from the front, the right hand terminal wire 28 is soldered to the wire connected to the upper pin retaining screw 21 and the left to the lower screw 21. During this operation the piece of spring wire 27 which protrudes alongside the copper terminal wire 28 is included in the soldered joint, and care is again exercised to avoid thermal damage to the material of the plug 24. The left hand terminal wire 28 of the lower pair is connected in a like manner to the earth or common return wire 35 while the remaining terminal wire 28 is left unconnected for possible future use.

The plug 24 is then placed loosely in the reamered end of the tube part 7. Taking a butt ended steel rod the same diameter as the reamer used, the plug 24 is then pushed firmly into the narrower portion of the tube part 7, ensuring that the fine wires 22 are not trapped at the shoulder, and that the plug 24 is accurately vertical as previously defined. The plug 24 is pushed in until the steel rod is halted by the shoulder, at which stage the outer face of the plug 24 will be in the same plane that will be occupied by the ends of the terminal pins on the transducer shell when the terminal block of the transducer is pushed into the tube part 7. Thus, with the transducer shell in position and the pins making contact, the springs 26 will have undergone 1/16" compression. Friction between the metal casing of the transducer terminal block and the interior of the tube part 7 is utilised to hold the transducer shell in position. If additional grip is required a narrow slit is cut in the under side of the tube for the length of the reamered portion which is then closed by pressure from the outside, care being taken to maintain a circular cross section.

The ends of the bearing pins 14 are pivotally engaged in complementary bearing socket parts including concave recesses formed at the ends of brass screws 36 projecting inwardly of the gimbal ring 6. Lock nuts 37 are provided for securely locking the screws 36 with respect to the ring 6.

The ring 6 is mounted by means of a rocker pin bearing for pivotal movement about the horizontal axis.

The pivotal mounting of the ring 6 includes two bearing pin mounts 38 extending radially horizontally outwards from the ring 6. The mounts 38 are conveniently formed by two brass bolts which are securely held in place by an application of varnish to the first visible threads of the bolts. Each mount 38 is apertured by a radial through bore 41 which is an interference fit with respect to a vertically directed rocker bearing pin 42 which is of similar form to the vertical bearing pins 14. The actual bearing tip of each pin 42 terminates within the respective mounts 38. The through bore 41 in each mount 38 is counterbored to half its depth to provide a clearance hole 43 for a bearing socket 44 with which the tip of the pin 42 engages. A locking screw 45 is provided to lock each pin 42 in its mount 38.

The bearing sockets 44 are formed by vertically arranged screws having concave recesses at their ends, the screws being carried by support brackets 46 bolted to the inner surface of a tubular plastic base column 47. A lock nut 51 is used to lock each of the sockets 44 with respect to its support bracket 46.

The engagement of the vertical pins 42 with the bearing sockets 44 located at opposite sides of the ring 6 provides a rocker pin bearing having a horizontal pivotal axis.

Printed circuits 52 and 53 respectively pass round the inside and outside of the ring 6, the ring being formed from a strong electrical insulating material such as phenol formaldehyde, synthetic plastic laminate. The circuits 52 and 53 subtend the upper right and lower left quadrants of the ring 6, viewed from the front of the pick-up arm. The outer circuits 53 each make contact with a respective one of the vertical bearing socket lock nuts 37 while the inner circuits 52 each connect with a respective one of the horizontal bearing pin mounts 38. C-shaped spring clips 54 are slipped on to the ring 6 in each of the aforementioned quadrants in order to electrically connect each outer printed circuit with its parallel inner printed circuit. The printed circuits round each quadrant together with their spring clips 54 interconnect an inwardly directed socket screw 36 with an outwardly directed bearing pin mount 38. Since the parts of the vertical bearings and the horizontal bearings are electrically conductive, the printed circuits 52 and 53 provide a means of completing the electrical circuit from the axially directed screws 21 to which the ends of the wires 22 are attached, to the support brackets 46 on the tubular base column 47. The support brackets 46 are connected by means of soldering tags 55 and wires (not shown) to tags 56 on a tag strip 57 cemented across an internal diameter of the base column 47 near to its lower end. The tags 56 on the strip 57 are intended to be connected to the amplifiers and the like.

The above described electrical connections are associated with the two live sides of a stereo transducer head. The earth return for the head is provided by the third or earth return wire 35 which is soldered to a C-shaped spring clip 58 positioned around the tubular arm 1 just to the rear of the bearing assembly, and with its open end uppermost. To the underside and as close as possible to the plane of the bearings is soldered the end of a length of very fine tinned copper wire 61, for example, 42 S.W.G. or finer. The wire 61 is shaped and loosely coiled in such manner that when freely suspended from the clip 58 with the arm 1 in a mid-position in its bearings, the opposite end of the wire 61 very lightly makes contact with a metal strip 62 bolted to the inside of the base column 47. This end of the wire 61 is then soldered in this position to the metal strip 62. This procedure ensures that the wire exerts zero force on the arm 1 in its mid-position, and any small force in other positions is minimized by the connection of the wire 61 as close as possible to the vertical axis of the bearing. It will be appreciated that the ideal position will be at the point of intersection of the bearing axes, but this point is inaccessible. Since most of the movement while tracking a record is in a horizontal plane, the axis permitting horizontal movement is the most important and the closest point to this axis is the best. The actual point of connection may be as little as $\frac{1}{32}''$ away from the said axis, and the force exerted on the arm is then extremely small. Since the wire 61 is the earth return wire and is at the same electrical potential as the tubular arm 1 there is no need for the wire 61 to be insulated or screened, a factor which further increases the compliance of the wire. Finally a wire (not shown) is connected between the metal strip 62 and a tag on the tag strip 57.

It will be noted from the foregoing that two complete circuits have been made from the pick-up head to the amplifiers with only one very fine bare uninsulated wire having passed from one side of the bearing assembly to the other and that this wire is almost ideally situated for minimum interference with movement of the pick-up arm. In other words, the possibility of drag arising from connecting wires has been substantially eliminated. Even the remaining wire 61 could be eliminated by suitably adapting the bearing assembly but unless bearings of even lower friction were used, any further improvement would be of negligible consequence.

The counterweight arrangement 5 conveniently includes brass weights 63 and 64, weight 63 being positionally adjustable lengthwise of the pick-up arm and the other 64 being adjustable laterally, in order to bring the centre of gravity of the arm to the point of intersection of the bearing axes. In practice, the major part of the counterweight 63 is formed by a cylindrical brass element 65, the main counterweight, secured to the pick-up arm by a tubular sleeve element 66 which may be of the same synthetic plastic used for the base column 47, and which engages over the end of the pick-up arm. The longitudinally adjustable part of the counterweight arrangement includes a brass sleeve 67 slidable along the main counterweight 65 and which is held in any desired position by pressure springs 68 internally mounted and bearing on the main counterweight 65. The springs 68 are in the form of two springy metal strips whose ends engage in recesses 71 cut in the internal wall of a widened part of the brass sleeve 67. The springs 68 are mounted diametrically opposite each other with their length extending across the pick-up arm. The sleeve 67 is moved by rotating it and at the same time gently urging it in the desired direction of movement. Near the rear end of the main counterweight 65 a short radially directed steel rod 72 is mounted on which slides a further brass sleeve, this forming the laterally adjustable part 64 of the counterweight arrangements. The steel rod 72 is secured in a hole in the counterweight 65 by a brass locking screw 73 passing axially along the main counterweight 65 from the rear. The laterally adjustable sleeve 64 is locked in position by a similar screw 74 mounted radially in the sleeve 64. All the parts comprising the counterweight arrangements may be made in any dense metal, the denser the better, compatible with economy and pleasing appearance. The radially directed rod 72 must be of a hard material since it has locking screws bearing on it which should not leave impressions in the rod. The spring strips 68 may be made of beryllium copper (Telcon bronze).

The counterweight adustments alter the position of the centre of gravity of the pick-up arm within a single horizontal plane. This plane may be raised or lowered so that it includes the horizontal bearing axis by adjusting the vertically mounted bearing socket screws 36 on the gimbal ring 6, alternately one turn at the time in the same direction.

The downward pressure at the stylus tip required for the tracking of a recorded disc is provided by means of a small electro-plated brass sleeve 75 of known mass slidable along the front tube part 7. The pick-up arm is balanced with the sleeve 75 at a predetermined distance from the pivot axis and the desired downward pressure is then applied by moving the sleeve 75 nearer to the stylus. Suitable marked graduations (not shown) are provided on the arm to enable any desired pressure to be applied, within accepted limits, say 0–4 grams. Such a sleeve 75 of weight 10 grams would provide 1 gram of pressure at the stylus for each additional inch of movement towards the stylus, assuming a stylus to bearing distance of 10 inches.

The tubular base column 47 is made in strong black synthetic plastic material of sufficient thickness to provide adequate mechanical support for the pick-up arm, for example $\frac{1}{16}''$ thick. The upper end of the column 47 widens in a shape corresponding to a portion of a sphere with its centre at the intersection of the vertical and horizontal axes of the pick-up arm, and is cut away at the back and front to allow movement of the arm. At the moulding stage, holes are left for bolts 82 which secure the horizontal bearing socket mounting brackets 46 and the earth return strip 62. Except for the areas where the brackets 46 will be mounted and where the tag strip 57 will be cemented the interior of the column 47 is plated with a conductive metallic film to provide electrical screening. The solder tag strip 57 which is cemented diametrically across the inside of the column 47 is secured a short distance up the latter to facilitate removal (by cutting) of the lower end should there be insufficient space beneath the turntable board on which the pick-up will eventually be mounted.

A suitable synthetic plastic material for the moulding of the base column 47 is cellulose acetate, this material being tough, economical, easily fabricated and easily plated with a metal film, and having good insulating properties. Moreover, it may be given a high polish.

The hollow hemispherical cover 84 is of the same material as the column 47 and is slightly larger in diameter so as to clear the part spherical top of the column. The cover 84 has semicircular recesses diametrically opposite each other and of the same diameter as the tubular arm 1. Projecting from the deepest part of each recess and perpendicularly towards the plane face of the hemisphere are the pages 34 for engagement in the holes 33 previously made in the top of the arm. These holes 33 have been made slightly wider apart than the pegs 34 so that fitting or removal is by gently squeezing the sides of the cover 84 thereby making the diameter between the recesses the major axis of an elipse. The thickness of the material of the cover 84 is much less than that of the column 47, for example 1/32", and the interior surface is plated with a metallic film which extends to the pegs 34 in order to make contact with the arm. This provides a measure of electrical screening for the bearing.

The base clamp 76 is an aluminium casting consisting of a short tube 77 around which is disposed a flange 78 for fixing to a turntable board. The flange 78 has been sheared flush with the side of the tube 77 at two diametrically opposite points so that in effect it forms two flanges. The fixing holes 83 are elongated, for convenience of fixing, their centres following an arc of a circle centred at the axis of the tube 77. The internal diameter of the tube 77 is such that the base column 47 will be a firm sliding fit within it. All but the lower part of the tube 77 is slotted lengthwise, the slot 79 passing through one of the two points where the flange 78 is absent. Two lugs 81, one each side of the slot are positioned at the same level as the flange 78. The lug 81 to the right of the slot (viewed from above) is drilled to clear for example a 6 B.A. bolt while the other is tapped to accept the same bolt so that insertion and tightening of the bolt will draw the lugs 81 towards each other, tending to close the slot 79. Tightening the bolt with the base column 47 in the base clamp 76 will secure the column 47 at any desired height. The lugs 81 preferably define the rear of the base clamp 76, the front face of the flange 78 tangentially facing the turntable, so that the clamping bolt is accessible from the right hand side in accordance with conventional mounting of a pick-up arm.

All aluminium parts of the pick-up arm assembly are silver anodised. All visible bolts are preferably nickel plated cheesehead bolts except for the bolts securing the brackets 46 to the base column 47, which are made of an electrically insulating material such as nylon or polytetrafluoroethylene to prevent electrical contact with any conductive outside body. Since these bolts, if of metal, would be connected to the amplifiers, such contacts would cause undesired noises to be emitted from the loudspeakers.

It will be understood that the pivotal arrangements of the pick-up arm could be reversed, and the wires would, in this case, be connected with the horizontal pivots.

I claim:

1. A phonograph pick-up arm assembly comprising an arm carrying pick-up connection means at one end, counterbalance means at its other end and a gimbal bearing assembly for the arm intermediate its ends, said bearing assembly including a plurality of electrically conductive pivotal elements through which electrical signals from the pick-up, via said pick-up connection means, are transmitted to fixed wires which lead to amplifiers, said pivotal elements having electrical insulation means provided between pairs of adjacent pivots and an electrical connection provided between one pivot and the other within each such pair.

2. A pick-up arm assembly as claimed in claim 1, wherein the bearing assembly comprises a gimbal ring of insulating material carrying two electrically conductive first bearing socket members which are oppositely disposed and which are engaged by first bearing pins insulatedly extending from the pick-up arm, means being provided for connecting said first bearing pins to terminals of said pick-up connection means.

3. A pick-up arm assembly as claimed in claim 2, wherein said gimbal ring is provided with oppositely directed bearing pin mounts extending with their axes at right angles to said first bearing socket members, said bearing pin mounts carrying second bearing pins which engage electrically conductive second bearing socket members carried by a supporting member for the arm.

4. A pick-up arm assembly as claimed in claim 3, wherein the gimbal ring carries electrically conductive portions forming interconnections in each case between one of said first bearing socket members and one of said bearing pin mounts.

5. A pick-up arm assembly as claimed in claim 4, wherein the electrically conductive portions are in the form of printed circuits.

6. A pick-up arm assembly as claimed in claim 2, wherein said arm is tubular and is divided into two portions, at the region of said first bearing pins, said portions being united by a plug of electrically insulating material in which said first bearing pins are mounted.

7. A pick-up arm assembly as claimed in claim 6, wherein said first bearing pins are retained in said plug by screws which electrically contact the pins and to which wires disposed in the interior of said arm are connected, said wires extending to connection with said terminals.

8. A pick-up arm assembly as claimed in claim 1 wherein said counterbalance means comprise at least one counterweight, the disposition of which is adjustable longitudinally of said arm.

9. A pick-up arm assembly as claimed in claim 1 comprising a pick-up head connected to said pick-up head connection means.

References Cited

UNITED STATES PATENTS

| | | | |
|---|---|---|---|
| 2,993,698 | 7/1961 | Stanton | 274—23 |
| 3,028,161 | 4/1962 | Siebert | 274—23 |
| 3,116,940 | 1/1964 | Jines | 339—7 X |
| 3,297,830 | 1/1967 | Baloghy | 274—23 |

FOREIGN PATENTS

| | | |
|---|---|---|
| 527,953 | 4/1954 | Belgium. |

HARRY N. HAROIAN, *Primary Examiner.*